Patented Aug. 11, 1953

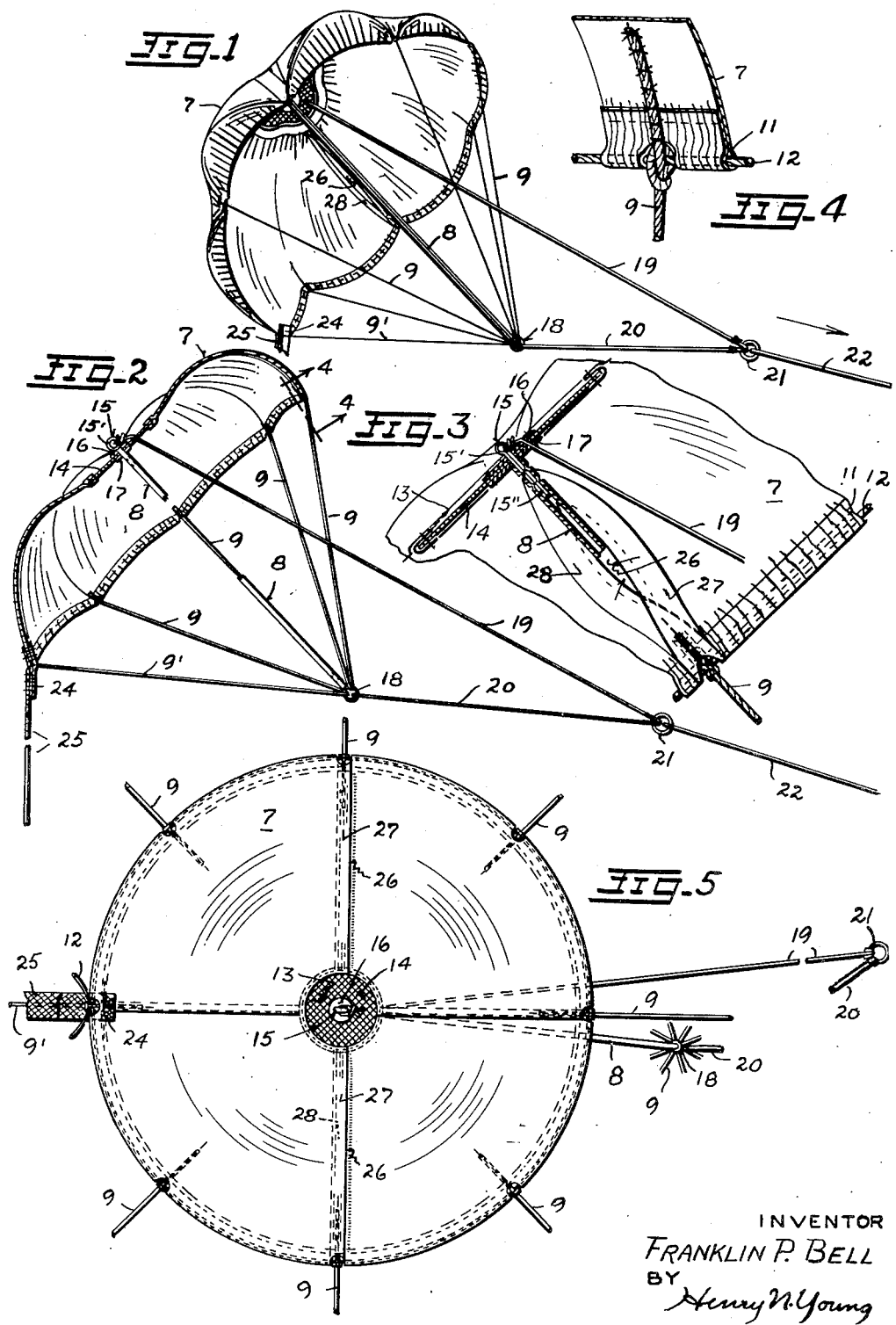

2,648,508

UNITED STATES PATENT OFFICE 2,648,508

KITE

Franklin P. Bell, Walnut Creek, Calif.

Application April 25, 1950, Serial No. 158,006

12 Claims. (Cl. 244—153)

The invention relates to a kite structure.

An object of the invention is to provide a kite of particularly light weight for its required lifting capacity.

Another object of the invention is to provide a kite structure which may be flown with a minimum of oscillation and bobbing actions.

A further object is to provide a unitary kite assembly which is readily collapsible into a particularly compact package for its transportation and storage.

A more specific object is to provide a kite in which certain advantageous structural and operative features of parachutes are incorporated.

The invention possesses other objects and features of advantage, some of which, with the foregoing, will be set forth or be apparent in the following description of a typical embodiment thereof, and in the accompanying drawings, in which, Figure 1 is a side perspective view of the kite of my invention in a flying condition and position.

Figure 2 is an enlarged sectional view taken at the plane of the bridle for the flying kite.

Figure 3 is an enlarged sectional showing of a portion of Figure 2.

Figure 4 is an enlarged fragmentary perspective view taken at the line 5—5 in Figure 2.

Figure 5 is a plan view of the kite structure in non-flying condition and having its parts in a generally coplanar relation.

By reference to the drawings of the present embodiment of my kite, it will be noted that a sustaining element 7 of flexible sheet material is arranged to assume the general dished form of the canopy of a parachute when the kite is being flown, and that the only rigid frame member of the structure comprises an elongated element 8 having one end secured to the element 7 at the central point of the element and having its other end connected to spaced points of the periphery of the element 7 by means of mutually independent lines 9, all of the lines 9 being arranged to be in tension when the kite is in its illustrated flying condition of Figures 1 and 2 whereby the element 8 then functions as a strut between the apex of the element 7 and its connection with the lines 9. Noting that the element 7 of the flying kite has assumed the general dished or cupped form of the canopy of an operating parachute and that the lines 9 correspond in arrangement to the load-supporting shroud lines of a parachute, the usual terminology relating to parachute structures may, for descriptive convenience, be hereinafter employed; accordingly, the element 7 may be referred to as a canopy, the tension lines 9 may be called shroud lines, and other parts corresponding to parachute parts are correspondingly nameable.

It will now be noted that the sustaining canopy element 7 primarily comprises a circular disc of flexible sheet material of suitable strength, such as a tough cellulosic film or a woven fabric, and is provided at its periphery with a continuous tubular hem 11 which freely receives a drawstring 12. At its center, the canopy 7 is provided with a circular vent hole 13 having a disc 14 of an open mesh material fixed across it as an integral part of the canopy thereat, the mesh disc being arranged for a retarded flow of air through its interstices when the kite is flying to provide a constant pressure relief for the space defined within the canopy for preventing a bobbing action of the kite and its steadied flying positioning.

The rigid frame element 8 has one end fixed to the vent disc 14 at the center of the latter, and is preferably tubular for giving it the desirable combined qualities of lightness and stiffness. As particularly shown, a member 15 providing a terminal eye 15' at the end of a stem 15" has its stem extended axially through a relatively small outer clamp disc 16, centrally through the mesh disc 14, and through an inner clamp disc 17 into the bore of the element 8 in fixed engagement therein. The discs 16 and 17 are relatively small, are of flexible material, and are suitably fixed together through the mesh disc 14 for securing the element 8 to the discs 16 and 17 in an assembly which is secured between the eye 15' and the opposed extremity of the element 8. A member 18 mounted at the opposite end of the frame element 8 is formed as the member 15 and has its stem portion fixed in the element end with its eye portion 18' having the shroud lines individually tied to it.

Bridle lines 19 and 20 of appropriate fixed lengths extend respectively from the eyes 15' and 18' at the extremities of the element 18 to a common ring 21 to which the flight line or cord 22 for the kite is also attached. The line 19 extends through the mesh disc 14 at a point outwardly of and adjacent the clamp discs 16 and 17, and is cooperative with the line 20 and the line of the rigid element 18 to define a triangle with the line 19 uppermost and more or less in alignment with the line 22 when the kite is flying; preferably, and as shown, the line 20 is slightly shorter than the length of the element 8, and the element 8 is somewhat longer than the radius of the circle of the canopy 7.

It will now be noted that the present kite structure is prepared for its flying by closing the loop of the drawstring 12 to longitudinally gather the hem into an effective length which is approximately two-thirds of the true hem length. Preferably, and as shown, the extending drawstring ends are lapped and secured to the canopy at the tying point for a shroud line 9' which is in generally coplanar relation with the triangle of the bridle 19—20 at the opposite side of the element 8 therefrom. A strap 24 of webbing is fixed to the canopy 7 at the tying point for the line 9' and the drawstring 12, and is arranged to have an elongated tail member 25 of appropriate length and weight attached thereto. Except for the shroud line 9', the other shroud lines 9 have a like length which is slightly shorter than that of the line 9'; the arrangement provides for a desirable rearward extension of the canopy portion thereat in general alignment with the operative kite tail as positively contributing to the spilling of the lifting air from the bottom of the canopy.

Under flying conditions, the sustaining canopy element 7 is bellied out from the line of the hem 11 which is secured to the eye 18' of the rigid element 8 by the shroud lines 9 and 9', the tail element 25 being operative in accordance with its length and the distribution of weight along it for preventing an undue oscillation of the flying kite. Noting that the retarded escape of air through the mesh disc at the vent hole 13 is arranged to prevent a bobbing action of the flying kite in a moderate wind, means are preferably provided for preventing or limiting the bobbing action under high-wind conditions, said means comprising the provision of normally closed radial escape slits 26 at opposite sides of the canopy from the plane of the bridle 19—20. As particularly shown, the slits 26 are defined between transversely opposed lapped canopy portions 27 and 28 such that a high pressure distending of the canopy thereat is operative to provide an escape opening for relieving the distention pressure to prevent or minimize any bobbing action which might result from air surges into the space of the canopy element 7; as is brought out in Figures 3 and 5, the lapped canopy portions 27 provided by the upper part of the canopy are provided inwardly of the lapped canopy portions 28 of the lower canopy part.

By reason of its structure, a present kite may be launched and retrieved directly by the hand of an operator with little effort and while the operator is standing still, whereby the kite may be flown from a limited ground or deck area. Also, this kite has been found to remain in stable flight within at least a ten-mile per hour variation of wind velocities with a given tail loading, thereby providing for its uninterrupted use even through wind velocities vary considerably. A further noteworthy advantage of the present kite structure is the fact that the fully flexible sustaining canopy 7 thereof may be compressedly and closely extended along the rigid frame element 8 in generally plaited condition to provide an elongated package of relatively small diameter for ready encasement and transportation in a particularly compact condition not approachable with other known types of kites.

In view of the foregoing, it will be understood that the present kite advantageously utilizes certain design and operative features of usual parachute structures in a particularly simple and effective manner. Also, it has been found that a given present kite provides an appreciably greater lift and flying-line pull than a kite of any other known type and of the same weight, whereby a longer flight line 22 may be used for greater altitude and/or ground distance of flight. Furthermore, the flight line 22 may comprise a radio aerial, or an electrical conductor, or conductors for radio or radar or meteorological or photographic units carried by the kite. Then too, if a kite of the present structure is large enough, it may support a man, or men, for observation or other purposes. The various members of my kite assembly may be metallic or non-metallic in accordance with the intended use of the kite, with non-metallic members usually preferable for kites to be flown for sport only.

From the foregoing description taken in connection with the accompanying drawings, the advantages of the present kite will be readily understood by those skilled in the art to which the invention appertains. While I have described the structure and principle of operation of my kite with reference to a form which I now consider to comprise a preferred embodiment thereof, I desire to have it understood that the showing is primarily illustrative, and that such changes and developments may be made, when desired, as fall within the scope of the following claims.

I claim:

1. In a kite, a circular sustaining element of flexible sheet material which is free to assume the general form of a parachute canopy under flight conditions, a rigid strut member having an end thereof directly attached to the center of said element, flexible shroud lines connecting the other end of the strut member with mutually spaced peripheral points of the element, a flight line for the kite, and bridle lines connecting solely the opposite ends of the member with the flight line.

2. In a kite, a sustaining element of flexible sheet material which is free to assume the general basin form of a parachute canopy under flight conditions, a straight rigid strut frame member having an end thereof directly attached to the element centrally thereof for its extension in the space of the formed element axially thereof, flexible shroud lines connecting the other end of the strut member with mutually spaced peripheral points of the element, a flexible flight line for the kite, and flexible bridle lines connecting solely the opposite ends of the member with the terminus of the flight line.

3. In a kite, a circular sustaining element of flexible sheet material which is free to assume the general form of a parachute canopy under flight conditions and having a minor central portion which has a relatively high degree of air permeability as compared to its remaining portion, an elongated and rigid frame member having an end thereof directly attached to the center of the element, flexible shroud lines connecting the other end of the member with mutually spaced peripheral points of the elements, a flight line for the kite, and bridle lines connecting solely the opposite ends of the frame member with the flight line.

4. In a kite, a circular sustaining element of flexible material which is free to assume the variably dished form of a parachute canopy under flight conditions and provided with a normally closed radial slit for opening to relieve excess pressure within the element under flying conditions, a rigid strut member having an end thereof directly attached to the center of said element, flexible tension lines connecting the other end of the strut member with mutually spaced peripheral points of the element, a flight line for the kite, and bridle lines connecting solely the opposite ends of the member with the flight line.

5. In a kite, a circular sustaining element of flexible material which is free to assume the generally cupped form of a parachute canopy under flight conditions and provided with aligned and normally closed radial slits for opening to relieve excess pressure within the element under flight conditions, a rigid strut member having an end thereof directly attached to the center of said element, flexible tension lines connecting the other end of the strut member with mutually spaced peripheral points of the element, a flight line for the kite, and bridle lines connecting solely the opposite ends of the member with the flight line in a plane which is generally perpendicular to the plane defined by the slits under flight conditions.

6. In a kite, a circular sustaining element of flexible sheet material which is free to assume the general dished form of a parachute canopy under flight conditions, said element having a minor central portion which has a relatively high degree of air permeability as compared to its remaining portion and said remaining portion of the element being provided with aligned and normally closed radial slits for opening to relieve excess pressure within the element under flight conditions, a straight rigid frame member having an end thereof directly attached to the center of said element, flexible tension lines connecting the other end of said frame member with mutually spaced peripheral points of the element, a flight line for the kite, and bridle lines connecting solely the opposite ends of the member with the flight line in a plane which is generally perpendicular to the plane defined by the slits under flight conditions.

7. In a kite, a sustaining element of flexible material which is free to assume the general dished form of a parachute canopy under flight conditions and provided with a continuous flexible peripheral hem, a drawstring in said hem contracting the hem to an effective length which is appreciably less than the actual hem length, an elongated and rigid strut member having an end thereof directly attached to the center of the sustaining element, flexible tension lines connecting the other end of the strut member with mutually spaced points of the element at the drawstring, a flight line for the kite, and bridle lines connecting solely the opposite ends of the member with the flight line.

8. In a kite, a sustaining element of flexible material which is free to assume the general dished form of a parachute canopy under flight conditions, a straight rigid frame member having an end thereof directly attached to the element centrally thereof and extending normal thereto within the parachute canopy thereof, flexible tension lines connecting the other end of the frame member with mutually spaced peripheral points of the element, a flight line for the kite, bridle lines connecting solely the opposite ends of the member with the terminus of the flight line and defining a plane including a tension line at the opposite side of the frame member therefrom, and a tail member attached to the element solely at the juncture of a tension line therewith.

9. In a kite, a sustaining element of flexible material which is free to assume the general dished form of a parachute canopy under flight conditions, a relatively rigid frame member having an end thereof directly attached to the element centrally thereof and extending normal thereto within the parachute canopy thereof, flexible tension lines directly connecting the other end of the frame member with mutually spaced peripheral points of the element, a flight line for the kite, bridle lines connecting solely the opposite ends of the member with the terminus of the flight line, and a tail member attached to the element at a point thereof at the opposite ide of the frame member from the bridle lines.

10. A structure in accordance with claim 9 wherein the sustaining element is circular and the tail member is connected to the sustaining element at the end of a tension line and all of the tension lines other than the last-named tension line are of like length and are shorter than the latter.

11. In a kite, a sustaining element of flexible material which is constantly free to assume the variably dished form of an operative air-filled parachute canopy and having a central portion which has a relatively high degree of air permeability as compared with its remaining portion and provided in its remaining portion with a normally closed air-escape passage for opening to relieve excess pressure within the element space under flying conditions, an elongated rigid frame member having an end thereof directly attached to the element centrally thereof and extending normal thereto within the parachute canopy thereof, flexible tension lines connecting the other end of the frame member with mutually spaced peripheral points of the element, a flight line for the kite, bridle lines connecting solely the opposite ends of the element with the terminus of the flight line and a tail member attached to the frame member at a point single thereof at the opposite side of the frame member from the bridle lines.

12. In a kite, a circular and frameless sustaining element of flexible sheet material which is constantly free to assume the general form of a parachute canopy variable under flight conditions, a rigid strut member having an end thereof directly attached to an interior point of said element, shroud lines directly connecting the other end of the strut member with mutually spaced peripheral points of the element, a flight line for the kite, and bridle lines connecting solely the opposite ends of the strut member with the flight line.

FRANKLIN P. BELL.

References Cited in the file of this patent

UNITED STATES PATENTS

| Number | Name | Date |
|---|---|---|
| 225,306 | Thompson | Mar. 9, 1880 |
| 354,098 | Colby | Dec. 14, 1886 |
| 368,525 | Fleharty | Aug. 16, 1887 |
| 434,725 | Rockwell | Aug. 19, 1890 |
| 490,949 | Davis | Jan. 31, 1893 |
| 966,143 | Van Wie | Aug. 2, 1910 |
| 1,189,206 | Moreira | June 27, 1916 |
| 1,632,822 | Dahl | June 21, 1927 |
| 1,714,753 | Baker | May 28, 1929 |
| 1,862,247 | Tricau | June 7, 1932 |
| 2,134,282 | Irvin | Oct. 25, 1938 |
| 2,524,500 | Whitehurst | Oct. 3, 1950 |

FOREIGN PATENTS

| Number | Country | Date |
|---|---|---|
| 12,251 | Great Britain | June 25, 1894 |
| 398,388 | Germany | July 14, 1924 |
| 652,242 | Germany | Nov. 3, 1936 |